(12) United States Patent
Inoue et al.

(10) Patent No.: US 7,828,695 B2
(45) Date of Patent: Nov. 9, 2010

(54) CONTROL APPARATUS AND METHOD FOR SHIFT-POSITION CHANGING MECHANISM

(75) Inventors: Yuji Inoue, Nissin (JP); Yoshinobu Nozaki, Anjyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 444 days.

(21) Appl. No.: 11/979,525

(22) Filed: Nov. 5, 2007

(65) Prior Publication Data

US 2008/0113848 A1    May 15, 2008

(30) Foreign Application Priority Data

Nov. 15, 2006   (JP)   ............................. 2006-309464

(51) Int. Cl.
  *B60W 10/04*   (2006.01)
  *F16H 59/00*   (2006.01)
  *G06F 19/00*   (2006.01)

(52) U.S. Cl. ........................... 477/34; 477/98; 477/906; 701/64

(58) Field of Classification Search ................... 477/34, 477/97, 98, 906; 74/335; 701/62–64; 340/456
See application file for complete search history.

(56) References Cited

U.S. PATENT DOCUMENTS

| | | | | |
|---|---|---|---|---|
| 5,219,391 | A * | 6/1993 | Edelen et al. | ................... 74/335 |
| 7,040,187 | B2 * | 5/2006 | Amamiya et al. | ............. 74/335 |
| 7,442,147 | B2 * | 10/2008 | Matsuzaki et al. | ........... 477/107 |
| 7,567,051 | B2 * | 7/2009 | Hori et al. | ..................... 318/468 |

FOREIGN PATENT DOCUMENTS

| | | | |
|---|---|---|---|
| JP | A 5-223156 | 8/1993 | |
| JP | 05346159 A * | 12/1993 | ................. 477/906 |
| JP | A-2002-48231 | 2/2002 | |
| JP | A 2004-190839 | 7/2004 | |
| JP | A-2005-37334 | 2/2005 | |
| JP | A 2005-106099 | 4/2005 | |
| JP | A-2005-185068 | 7/2005 | |
| JP | A 2006-138436 | 6/2006 | |

OTHER PUBLICATIONS

Japanese Office Action issued in Japanese Patent Application No. 2006-309464, on Oct. 29, 2009.

* cited by examiner

*Primary Examiner*—Roger Pang
(74) *Attorney, Agent, or Firm*—Oliff & Berridge, PLC (57) ABSTRACT

A control apparatus for a shift-position changing mechanism that changes the shift positions of an automatic transmission mounted in a vehicle using a rotational force of an actuator based on the state of an operation member includes: a detection unit that detects a command to change the shift positions based on a change in the state of the operation member; a control unit that controls the actuator such that the actuator is rotated by a predetermined rotation amount, when a predetermined first condition concerning the state of the vehicle is satisfied in a case the command to change the shift positions is not detected; and a determination unit that determines that a failure has occurred in the shift-position changing mechanism, when a predetermined second condition on the control of the actuator is satisfied.

15 Claims, 9 Drawing Sheets

CONTROL APPARATUS AND METHOD FOR SHIFT-POSITION CHANGING MECHANISM

INCORPORATION BY REFERENCE

The disclosure of Japanese Patent Application No. 2006-309464 filed on Nov. 15, 2006 including the specification, drawings and abstract is incorporated herein by reference in its entirety.

BACKGROUND OF THE INVENTION

1. Field of the Invention

The invention relates generally to a control apparatus and method for a shift-position changing mechanism, which changes shift-positions of an automatic transmission using an actuator. More specifically, the invention relates to a control apparatus and method for a shift-position changing mechanism, which determines whether a failure has occurred in an automatic transmission.

2. Description of the Related Art

There is a shift-position changing mechanism which changes shift positions (hereinafter, sometimes referred to as "shift ranges") of an automatic transmission in response to an operation of a shift lever performed by a driver, and which is provided with an electric motor (for example, a direct-current motor) as a power source for changing the shift positions.

With such shift-position changing mechanism, the shift lever and the shift-position changing mechanism need not be mechanically connected to each other, unlike a common changing mechanism that directly changes shift positions of an automatic transmission using an operating force applied to a shift lever by a driver. This eliminates the limitation on the layout of components in a vehicle, thereby providing greater flexibility to the vehicle design. In addition, the shift-position changing mechanism thus structured is more easily fitted to the vehicle.

With this type of shift-position changing mechanism, when a failure occurs in the automatic transmission, a failsafe process needs to be executed promptly.

For example, Japanese Patent Application Publication No. 05-223156 (JP-A-05-223156) describes a "Shift-by-Wire" shift control unit for an automatic transmission, which reliably brings a vehicle into the limp home running mode that is appropriate for the road condition when a failure occurs. The "Shift-by-Wire" shift control unit includes a hydraulic sensor that detects the hydraulic pressure in a range-setting oil passage, range determination means for determining the shift range based on the hydraulic pressure detected by the hydraulic sensor, on-off state setting means for setting a combination of on-off states of solenoid valves, which is used to set the selected shift range, output means for transmitting signals to the solenoid valves in order to bring the solenoid valves into the on-off states indicated by the combination which is set by the on-off state setting means, and failure determination means. When the shift range determined by the range determination means differs from the selected shift range, the failure determination means instructs the on-off state setting means to change the combination of the on-off states of the solenoid valves in order to set the selected shift range.

The above-described "Shift-by-Wire" shift control unit determines that, a failure has occurred, when a hydraulic pressure is not generated in the range-setting oil passage that is used to set the selected shift range. When a failure has occurred, the shift control unit changes the combination of the on-off states of the solenoid valves, which is used to set the selected shift range, to another combination, and executes the on-off control over the solenoid valves. Accordingly, even if a failure, for example, valve-sticking occurs, it is possible to select and set the shift range. Therefore, it is possible to bring the vehicle into the limp home running mode under any road conditions.

However, because the above-described "Shift-by-Wire" shift control unit determines the shift position based on the hydraulic pressure detected by the hydraulic sensor, the timing at which the shift position is determined is sometimes delayed. This is because, when the temperature of the hydraulic fluid is low, the viscosity of the hydraulic fluid increases and therefore the timing at which the hydraulic pressure starts increasing or decreasing is delayed. If the timing at which the shift position is determined is delayed, the timing at which the failsafe operation is started may also be delayed.

SUMMARY OF THE INVENTION

The invention provides a control apparatus and method for a shift-position changing mechanism, which promptly determines whether a failure has occurred in an automatic transmission, thereby executing the failsafe process earlier if a failure has occurred in the automatic transmission.

A first aspect of the invention relates to a control apparatus for a shift-position changing mechanism that changes shift positions of an automatic transmission mounted in a vehicle using a rotational force of an actuator based on the state of an operation member. The control apparatus includes: a detecting unit that detects a command to change the shift positions based on a change in the state of the operation member; a control unit that controls the actuator such that the actuator is rotated by a predetermined rotation amount, when a predetermined first condition concerning the state of the vehicle is satisfied in the case where the command to change the shift positions is not detected; and a determination unit that determines that a failure has occurred in the shift-position changing mechanism, when a predetermined second condition is satisfied after the control over the actuator is started. A second aspect of the invention relates to a control method for a shift-position changing mechanism, which includes steps that correspond to the elements of the control apparatus according to the first aspect of the invention.

According to the aspects of the invention described above, in the case where a command to change the shift positions based on a change in the state of the operation member (for example, a shift lever) has not been detected, when the predetermined conditions concerning the vehicle state (for example, the condition concerning the shift position, the condition concerning the oil temperature, and the condition concerning the vehicle speed) are satisfied, the control for rotating the actuator by the predetermined amount is executed. When the predetermined second condition is satisfied after the control over the actuator is started, it is determined that a failure has occurred in the shift-position changing mechanism. Thus, whether a failure has occurred in the automatic transmission is determined before receiving the command to change the shift positions. For example, if the rotation amount of the actuator is smaller than the predetermined rotation amount although the control for rotating the actuator by the predetermined rotation amount is executed, it is determined that a failure has occurred in the automatic transmission connected to the actuator. In addition, because there is no influence of, for example, a delay in response of the hydraulic pressure to the control even in the environment where the temperature of the hydraulic fluid is low, it is possible to promptly determine whether a failure has occurred in the automatic transmission. Promptly determining whether a failure has occurred in the automatic transmission makes it possible to execute the failsafe process earlier. Therefore, it is possible to provide the control apparatus and method for the shift-position changing mechanism, which promptly determines whether a failure has occurred in the automatic transmission and executes the failsafe process if a failure has occurred in the automatic transmission.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein.

DETAILED DESCRIPTION OF EMBODIMENTS

Hereafter, embodiments of the invention will be described with reference to the accompanying drawings. In the description below, the same or corresponding components and steps will be denoted by the same reference numerals. The functions and the names of the components and steps having the same reference numerals are also the same. Accordingly, detailed description on the components and steps having the same reference numerals will be provided only once below.

Figure 1:
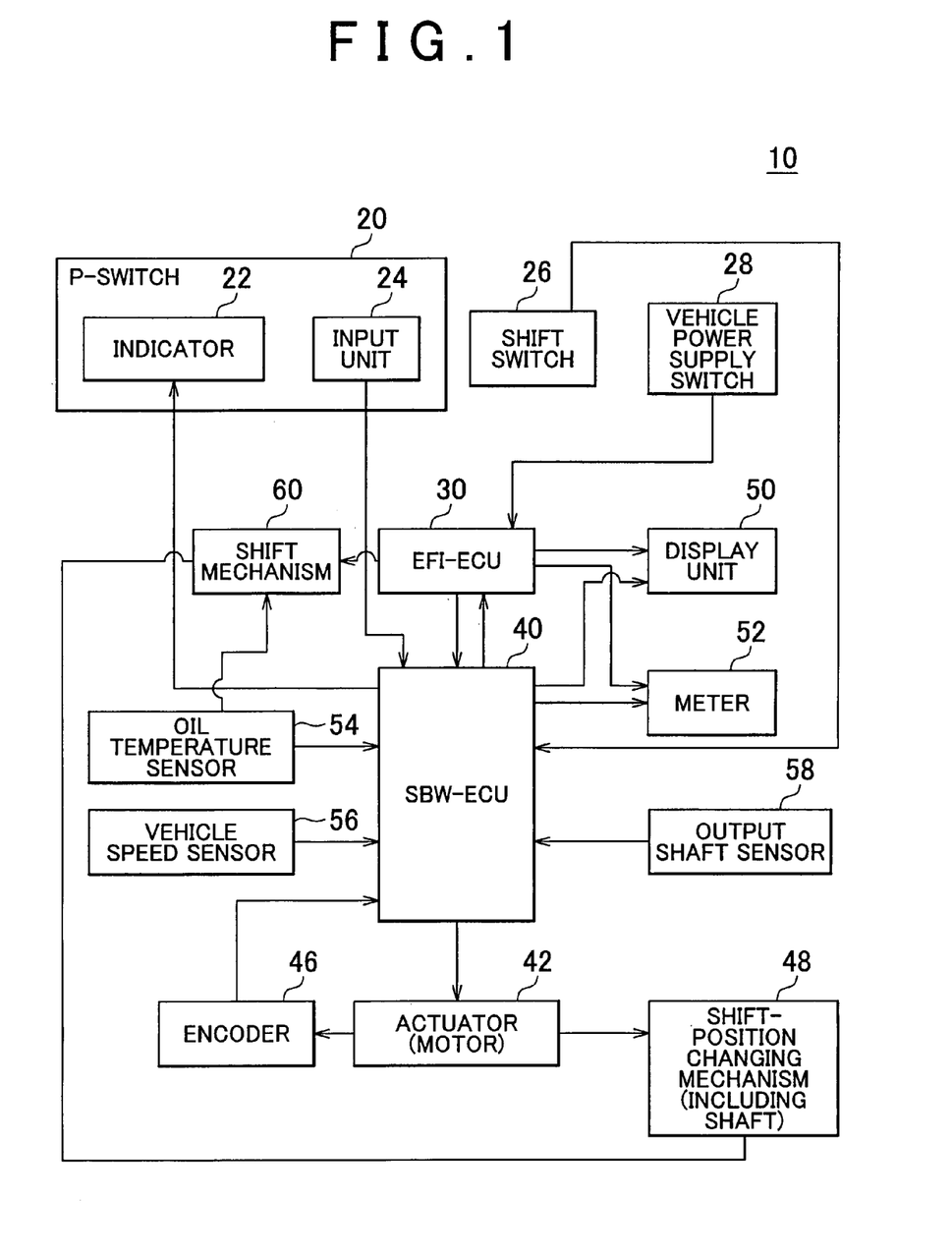
FIG. 1 is a view showing the structure of a control system for a shift-position changing mechanism according to a first embodiment of the invention.

FIG. 1 shows the structure of a shift control system 10 including a control apparatus for a shift-position changing mechanism 48 according to a first embodiment of the invention. The shift control system 10 is used to change the shift positions for a vehicle. The shift control system 10 includes a P-switch 20, a shift switch 26, a vehicle power supply switch 28, a vehicle control unit (hereinafter, referred to as an "EFI-ECU (Electronic Control Unit)") 30, a parking control unit (hereinafter, referred to as a "SBW (Shift-by-Wire)-ECU") 40, an actuator 42, an encoder 46, the shift-position changing mechanism 48, a display unit 50, a meter 52, a shift mechanism 60, an oil temperature sensor 54, a vehicle speed sensor 56, and an output shaft sensor 58. The shift control system 10 functions as a "Shift-by-Wire" system that changes the shift positions under electric control. More specifically, the shift-position changing mechanism 48 is driven by the actuator 42 to change the shift positions. The control apparatus for the shift-position changing mechanism 48 is implemented by the SBW-ECU 40.

The vehicle power supply switch 28 is used to change the on/off state of an electric power supply for a vehicle. Any type of switch, for example, an ignition switch may be employed as the vehicle power supply switch 28. A command that the vehicle power supply switch 28 receives from, for example, a driver is transmitted to the EFI-ECU 30. For example, when the vehicle power supply switch 28 is turned on, electric power is supplied from an auxiliary battery (not shown), whereby the shift-position control system 10 is actuated.

The P-switch 20 is used to change the shift position between Park (hereinafter, referred to as "P") and Non-Park (hereinafter, referred to as "Non-P"). The P-switch 20 includes an indicator 22 that indicates the current shift position (P or Non-P) to the driver, and an input unit 24 that receives a command from the driver. The driver inputs a command to change the shift position to P in the P-switch 20 through the input unit 24. The input unit 24 may be a momentary switch. A P-command signal that indicates the command from the driver, which is received by the input unit 24, is transmitted to the SBW-ECU 40. A component other than the P-switch 20 may be used to change the shift position from Non-P to P.

The SBW-ECU 40 controls the actuator 42 that drives the shift-position changing mechanism 48 to change the shift position between P and Non-P. The SBW-ECU 40 causes the indicator 22 to indicate the current shift position (P or Non-P). If the driver presses the input unit 24 when the shift position is in Non-P, the SBW-ECU 40 changes the shift position to P, and causes the indicator 22 to indicate that the current shift position is in P.

The actuator 42 is formed of a switched reluctance motor (hereinafter, referred to as a "SR motor"). The actuator 42 receives an actuator control signal from the SBW-ECU 40, and drives the shift-position changing mechanism 48. The encoder 46 rotates together with the actuator 42, and detects the rotational state of the SR motor. The encoder 46 is a rotary encoder that outputs an A-phase signal, a B-phase signal and a Z-phase signal. The SBW-ECU 40 receives a signal from the encoder 46 to determine the rotational state of the SR motor, and controls a supply of electric power used to drive the SR motor.

The shift switch 26 is used to change the shift position to Drive (hereinafter, referred to as D), Reverse (hereinafter, referred to as R), or Neutral (hereinafter, referred to as N). When the shift position is in P, the shift switch 26 is used to change the shift position from P to Non-P. A command from the driver, which is received by the shift switch 26, is transmitted to the SBW-ECU 40. The shift switch 26 transmits a shift signal indicating the shift position corresponding to the position of an operation member (for example, a shift lever), which is selected in response to the operation by the driver, to the SBW-ECU 40. The SBW-ECU 40 executes, using the actuator 42, the control to change the shift positions in the shift mechanism 60 in accordance with the shift signal indicating the command from the driver, and causes the meter 52 to indicate the current shift position. More specifically, when the shift position corresponding to the position of the shift lever based on the shift signal received from the shift switch 26 differs from the shift position based on the rotation amount of the actuator 42, the SBW-ECU 40 rotates the actuator 42 such that the shift position is changed to the shift position corresponding to the position of the shift lever.

The description below will be provided on the assumption that the shift mechanism 60 is a multi-speed speed-change mechanism. However, the shift mechanism 60 is not limited to a multi-speed speed-change mechanism. For example, the shift mechanism 60 may be a continuously variable speed-change mechanism.

The shift mechanism 60 has a hydraulic circuit provided with various valves such as manual valves (not shown). The shift positions and the manner of power transfer are changed by changing the hydraulic pressure in the hydraulic circuit. More specifically, the shift mechanism 60 includes a planetary gear mechanism (not shown), and friction devices, such as brakes and clutches, that change the manner in which each rotational element (a sun gear, a carrier, a ring gear, etc.) of the planetary gear mechanism rotates.

A spool valve (not shown) is slidably provided in the manual valve. When the spool valve is moved to one of the positions corresponding to the respective shift positions, the hydraulic pressure in the hydraulic circuit changes based on the position to which the spool valve is moved.

At this time, the engagement force in the friction device is changed in accordance with a change in the hydraulic pressure in the hydraulic circuit, whereby the shift mechanism 60 is brought within the state corresponding to the selected shift position. Namely, the manner in which the power is transferred from an engine to drive wheels (for example, the manner that corresponds to D, R, or N, or the gear ratio) changes in the shift mechanism 60. The engagement force in each friction device is controlled by the EFI-ECU 30 using various solenoid valves provided in the hydraulic circuit.

The shift-position changing mechanism 48 includes a shaft 102 connected to the actuator 42. The shaft 102 is provided with a detent plate 100 which will be described later in detail. The detent plate 100 is connected to a spool valve provided in a manual valve of an automatic transmission via a rod 104, etc. The spool valve in the manual valve may be directly connected to the shaft 102.

The shaft 102 is rotated by the actuator 42. The rotation of the shaft 102 enables the spool valve to move to the position corresponding to each shift position (i.e. D, R, and N).

When the actuator 42 is rotated to the rotation stop position corresponding to D, the spool valve is moved to the position corresponding to D. When the actuator 42 is rotated to the rotation stop position corresponding to R, the spool valve is moved to the position corresponding to R. When the actuator 42 is rotated to the rotation stop position corresponding to N, the spool valve is moved to the position corresponding to N.

The EFI-ECU 30 comprehensively controls the operation of the shift control system 10. The display unit 50 indicates a command, an alert, etc. provided from the EFI-ECU 30 or the SBW-ECU 40 to the driver. The meter 52 indicates the conditions of the vehicle components and the current shift position.

Figure 2:
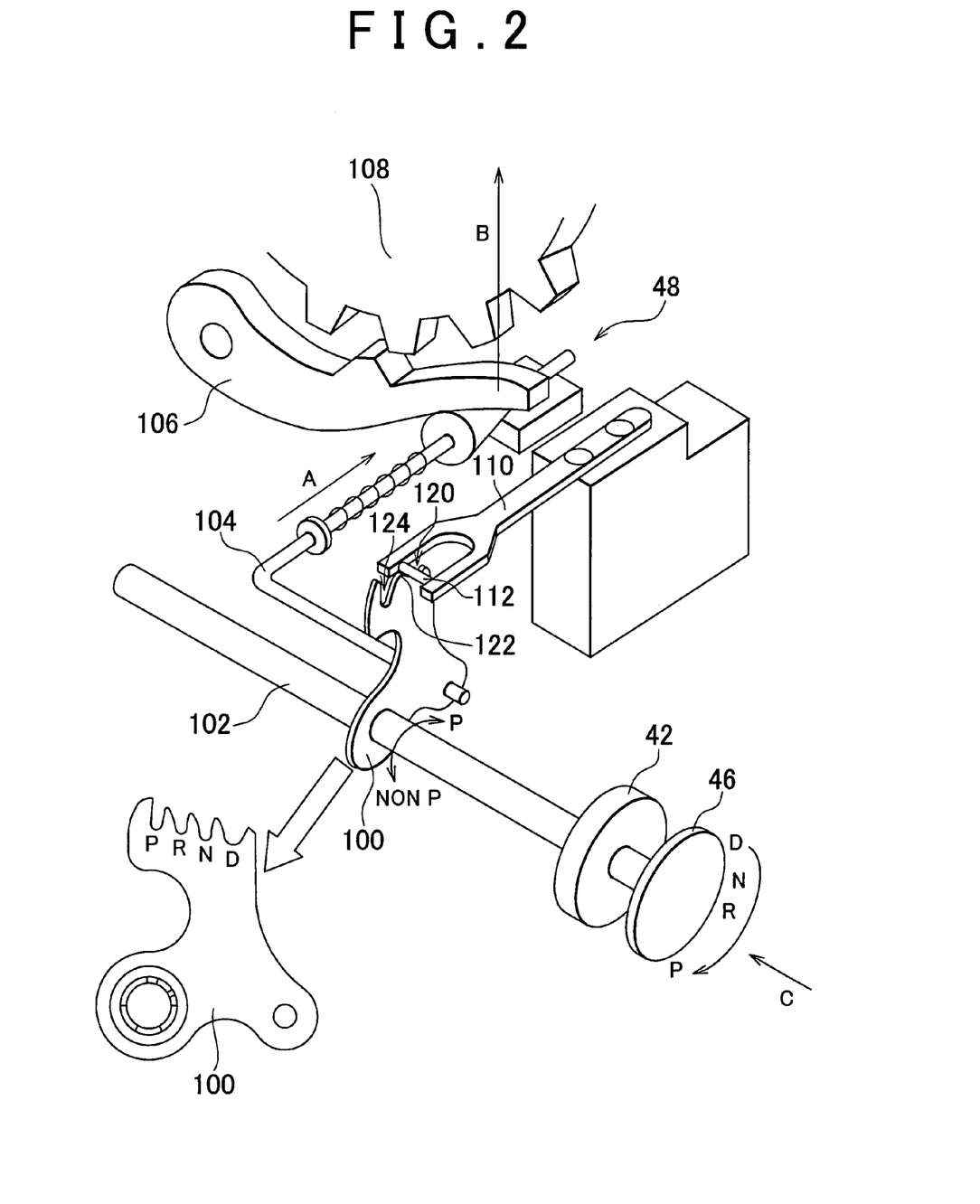
FIG. 2 is a view showing the structure of the shift-position changing mechanism.

FIG. 2 shows the structure of the shift-position changing mechanism 48. The shift positions include P and Non-P including R, N, and D. Non-P may include, in addition to D, D1 at which first gear is always selected and D2 at which second gear is always selected.

The shift-position changing mechanism 48 includes the shaft 102 that is rotated by the actuator 42, the detent plate 100 that rotates along with the shaft 102, the rod 104 that operates in accordance with the rotation of the detent plate 100, a parking lock gear 108 that is fixed to the output shaft of the automatic transmission (not shown), a parking lock gear locking pawl 106 that is used to lock the parking lock gear 108, a detent spring 110 that restricts the rotation of the detent plate 100 to fix the shift position at a predetermined shift position, and a roller 112. The detent plate 100 is driven by the actuator 42 to change the shift positions. The encoder 46 functions as count means that obtains a count value corresponding to the rotation amount of the actuator 42.

In the perspective view in FIG. 2, only two of the indentations formed in the detent plate 100 (an P-indentation 124 corresponding to P and a Non-P-indentation 120 corresponding to one of Non-P) are shown. However, the detent plate 100 actually has four indentations corresponding to D, N, R and P, as shown in the enlarged plane view of the detent plate 100 in FIG. 2. Changing of the shift position between P and Non-P will be described below. However, the invention is not limited to changing of the shift position between P and Non-P.

FIG. 2 shows the state in which the shift position is in Non-P. In this state, because the parking lock gear locking pawl 106 does not lock the parking lock gear 108, the rotation of the drive shaft of the vehicle is not interfered with. If the shaft 102 is then rotated in the clockwise direction, when viewed in the direction of the arrow C, by the actuator 42, the rod 104 is pressed via the detent plate 100 in the direction of the arrow A in FIG. 2, whereby the parking lock gear locking pawl 106 is pushed up in the direction of the arrow B in FIG. 2 by a tapered portion provided at the tip of the rod 104. As the detent plate 100 rotates, the roller 112 of the detent spring 110, which is positioned at one of the two indentations formed at the top portion of the detent plate 100, namely, the Non-P-indentation 120, climbs over a crest 122 and moves into the other indentation, namely, the P-indentation 124. The roller 112 is fitted to the detent spring 110 so as to be rotatable about its axis. When the detent plate 100 rotates until the roller 112 reaches the P-indentation 124, the parking lock gear locking pawl 106 is pushed up to a position at which the projection of the parking lock gear locking pawl 106 is placed between the teeth of the parking lock gear 108. Thus, the drive shaft of the vehicle is mechanically fixed, and the shift position is changed to P.

In the shift control system 10, the SBW-ECU 40 controls the rotation amount of the actuator 42 so that the impact caused when the roller 112 of the detent spring 110 drops into an indentation after climbing over the crest 122 is reduced to reduce the load placed on the components of the shift-position changing mechanism 48, such as the detent plate 100, the detent spring 110 and the shaft 102 when the shift positions are changed.

The SBW-ECU 40 determines that the shift position is in P, when the rotation stop position of the actuator 42, which is determined based on the rotation amount of the actuator 42 detected by the encoder 46, namely, the position of the roller 112 relative to the detent plate 100 is within the predetermined rotation stop positional-range corresponding to P.

On the other hand, when the rotation stop position of the actuator 42, which is determined based on the rotation amount of the actuator 42 detected by the encoder 46 is within the predetermined rotation stop positional-range corresponding to Non-P, namely, the position of the roller 112 relative to the detent plate 100 is within the predetermined range corresponding to one of D, R and N, the SBW-ECU 40 determines that the shift position is in Non-P.

The SBW-ECU 40 detects the rotation amount of the actuator 42 based on the counter value of the encoder 46.

The SBW-ECU 40 sets the rotation stop positional-range corresponding to each shift position based on the rotation amount of the actuator 42, which is restricted by the detent plate 100.

The oil temperature sensor 54 detects the temperature of the hydraulic fluid in the shift mechanism 60 (hereinafter, simply referred to as the "oil temperature"). The oil temperature sensor 54 is connected to the SBW-ECU 40, and transmits the signal indicating the detected oil temperature to the SBW-ECU 40.

The vehicle speed sensor 56 detects the physical quantity corresponding to the vehicle speed. For example, the vehicle speed sensor 56 may detect the rotational speed of the wheel, or the rotational speed of the output shaft of the shift mechanism 60. Alternatively, the vehicle speed sensor 56 may directly detect the vehicle speed. The vehicle speed sensor 56 is connected to the SBW-ECU 40, and transmits the signal indicating the detected vehicle speed to the SBW-ECU 40. The vehicle speed sensor 56 may be connected to the EFI-ECU 30. In this case, the SBW-ECU 40 receives the signal indicating the vehicle speed from the EFI-ECU 30.

The output shaft sensor 58 detects the rotational position of the shaft 102. More specifically, the output shaft sensor 58 is connected to the SBW-ECU 40, and transmits a signal indicating the rotational angle of the shaft 102 to the SBW-ECU 40. The SBW-ECU 40 detects the shift position based on the received signal indicating the rotational position. The range of the predetermined output values corresponding to each shift position is stored in the memory of the SBW-ECU 40. The SBW-ECU 40 determines the range that corresponds to the received signal indicating the rotational angle of the shaft 102, thereby determining the shift position selected by the shift-position changing mechanism 48. The output value from the output shaft sensor 58 linearly changes with respect to the rotational position (angle) of the shaft 102.

In the thus configured shift control system 10 according to the first embodiment of the invention, when a command to change the shift positions based on a change in the state of the shift lever has not been detected, if a predetermined condition concerning the vehicle state is satisfied, the SBW-ECU 40 rotates the actuator 42 by a predetermined rotation amount, thereby determining whether a failure has occurred in the automatic transmission.

The predetermined condition includes a first condition that the shift position in the shift mechanism 60 is the running shift position, a second condition that the temperature detected by the oil temperature sensor 54 is lower than a predetermined temperature, and a third condition that the speed detected by the vehicle speed sensor 56 is lower than a predetermined first speed. The predetermined first speed may be set to any speed at which it is determined that the vehicle is substantially stopped.

The description below will be provided on the assumption that the predetermined condition is satisfied only when all the first condition, the second condition and the third condition are satisfied. Alternatively, the predetermined condition may be satisfied when at least one of the first condition, the second condition and the third condition is satisfied.

When the speed detected by the vehicle speed sensor 56 is equal to or higher than a predetermined second speed, the SBW-ECU 40 terminates the control for rotating the actuator 42 by the predetermined rotation amount. The predetermined second speed may be set to any speed at which it is determined that the vehicle is running. When at least one of the first condition and the second condition described above is unsatisfied, the SBW-ECU 40 may terminate the control for rotating the actuator 42 by the predetermined rotation amount.

When the above-described control over the actuator 42 is terminated, the SBW-ECU 40 controls the actuator 42 such that the actuator 42 stops at a rotation stop position within the predetermined rotation stop positional-range corresponding to the selected shift position.

When the rotation amount of the actuator 42 is smaller than the predetermined rotation amount, the SBW-ECU 40 determines that a failure has occurred in the shift mechanism 60. When the output value from the output shaft sensor 58 does not change although the control for rotating the actuator 42 by the predetermined rotation amount is executed, the SBW-ECU 40 determines that a failure has occurred in the shift mechanism 60. In this case, a failure in the shift mechanism 60 is, for example, valve sticking that occurs when foreign matter sticks to the spool valve in the manual valve and the spool valve becomes immovable.

Figure 3:
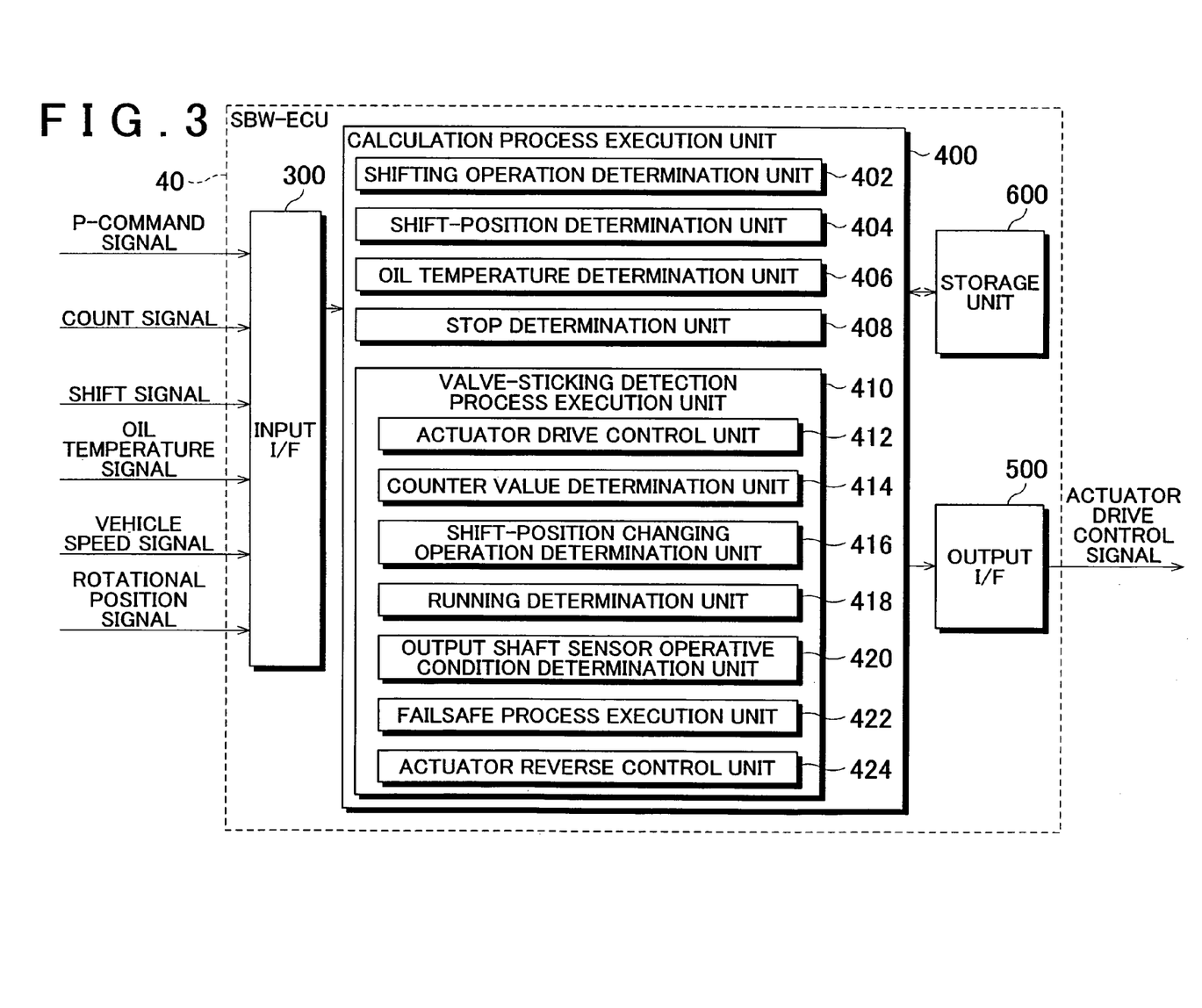
FIG. 3 is a functional block diagram of an SBW-ECU according to the first embodiment of the invention.

FIG. 3 is a functional block diagram of the SBW-ECU 40. The case where the shift position is in D or R will be mainly described below. However, the invention may be applied to the case where other shift positions are selected.

The SBW-ECU 40 includes an input interface (hereinafter, referred to an "input I/F") 300, a calculation process execution unit 400, a storage unit 600, and an output interface (hereinafter, referred to as an "output I/F") 500.

The input I/F 300 receives a P-command signal from the P switch 20, a count signal from the encoder 46, a shift signal from the shift switch 26, an oil temperature signal from the oil temperature sensor 54, a vehicle speed signal from the vehicle speed sensor 56, and a rotational position signal from the output shaft sensor 58, and transmits these signals to the calculation process execution unit 400.

The calculation process execution unit 400 includes a shifting operation determination unit 402, a shift-position determination unit 404, an oil temperature determination unit 406, a stop determination unit 408, and a valve-sticking detection process execution unit 410. The calculation process execution unit 400 is implemented by, for example, a CPU (Central Processing Unit).

The shifting operation determination unit 402 determines whether the driver has operated the shift lever to change the shift positions. Namely, the shifting operation determination unit 402 determines whether the shifting operation has been performed based on a shift signal received from the shift switch 26.

When the driver moves the shift lever from N to D, the shift signal transmitted from the shift switch 26 to the SBW-ECU 40 is changed from a shift signal corresponding to N to a shift signal corresponding to D. The shifting operation determination unit 402 receives such a change in the shift signal as a command to change the shift positions, and determines that the shifting operation has been performed. Alternatively, when the SBW-ECU 40 receives a shift signal corresponding to the shift position that differs from the shift position selected by the shift-position changing mechanism 48, the SBW-ECU 40 may regard reception of the shift signal as reception of a command to change the shift positions.

The shifting operation determination unit 402 may set an operation determination flag, when it is determined that the shifting operation has been performed.

The shift-position determination unit 404 determines whether the shift position selected by the shift-position changing mechanism 48 is one of D and R or not. Alternatively, the shift-position determination unit 404 may determine whether the shift position selected by the shift-position changing mechanism 48 is one of D, R and N or not.

The shift-position determination unit 404 determines whether the shift position selected by the shift-position changing mechanism 48 is one of D and R or not based on a rotational position signal received from the output shaft sensor 58. Namely, the shift-position determination unit 404 determines the shift position in the shift mechanism 60, which is selected by the shift-position changing mechanism 48 by detecting the rotational position of the shaft 102, and then determines whether the shift position is one of D and R or not.

When the shift position selected by the shift-position changing mechanism 48 is one of D and R, the shift-position determination unit 404 may set a shift-position determination flag.

The oil temperature determination unit 406 determines whether the oil temperature is lower than a predetermined temperature THO. The oil temperature determination unit 406 determines whether the oil temperature is lower than the predetermined temperature THO based on an oil temperature signal received from the oil temperature sensor 54. For example, if the oil temperature is lower than the predetermined oil temperature THO, the oil temperature determination unit 406 may set an oil temperature determination flag.

The stop determination unit 408 determines whether the vehicle is substantially stopped. More specifically, the stop determination unit 408 determines whether a predetermined time has elapsed since the vehicle speed falls below the predetermined first speed. The stop determination unit 408 determines whether the vehicle speed is lower than the predetermined first speed based on a vehicle speed signal received from the vehicle speed sensor 56. When the vehicle speed is lower than the predetermined first speed, the stop determination unit 408 determines whether the duration during which the vehicle speed is lower than the predetermined first speed exceeds a predetermined duration.

The stop determination unit 408 may set a stop determination flag when the duration during which the vehicle speed is lower than the predetermined first speed exceeds the predetermined duration.

The valve-sticking detection process execution unit 410 executes the valve-sticking detection process, which will be described later in detail, when a predetermined condition is satisfied. The predetermined condition is such a condition that the shift lever has been operated, a condition that D or R has been selected, a condition that the oil temperature is lower than the predetermined temperature THO, and a condition that the vehicle is substantially stopped. The valve-sticking detection process execution unit 410 may execute the valve-sticking detection process, when all the operation determination flag, the shift-position determination flag, the oil temperature determination flag and the stop determination flag are on.

Hereafter, the valve-sticking detection process executed by the valve-sticking detection process execution unit 410 will be described.

The valve-sticking detection process execution unit 410 includes an actuator drive control unit 412, a counter value determination unit 414, a shift-position changing operation determination unit 416, a running determination unit 418, an output shaft sensor operating state determination unit 420, a failsafe process execution unit 422, and an actuator reverse control unit 424.

The actuator drive control unit 412 transmits an actuator drive control signal to the actuator 42 via the output IVF 500 such that the roller 112 on the detent plate 100 moves toward the P-indentation 124. The actuator drive control unit 412 executes the control for rotating the actuator 42 by a predetermined rotation amount such that the detent plate 100 rotates by a predetermined rotation amount. The actuator drive control unit 412 rotates the actuator 42 until the count value of the encoder 46 matches the count value corresponding to the predetermined rotation amount (hereinafter, referred to as the "target count value").

The "predetermined rotation amount" may be any rotation amount within a rotation amount range that does not change the shift positions. Preferably, the predetermined rotation amount is set with a play between the actuator 42 and the shaft 102 taken into account.

Figure 4:
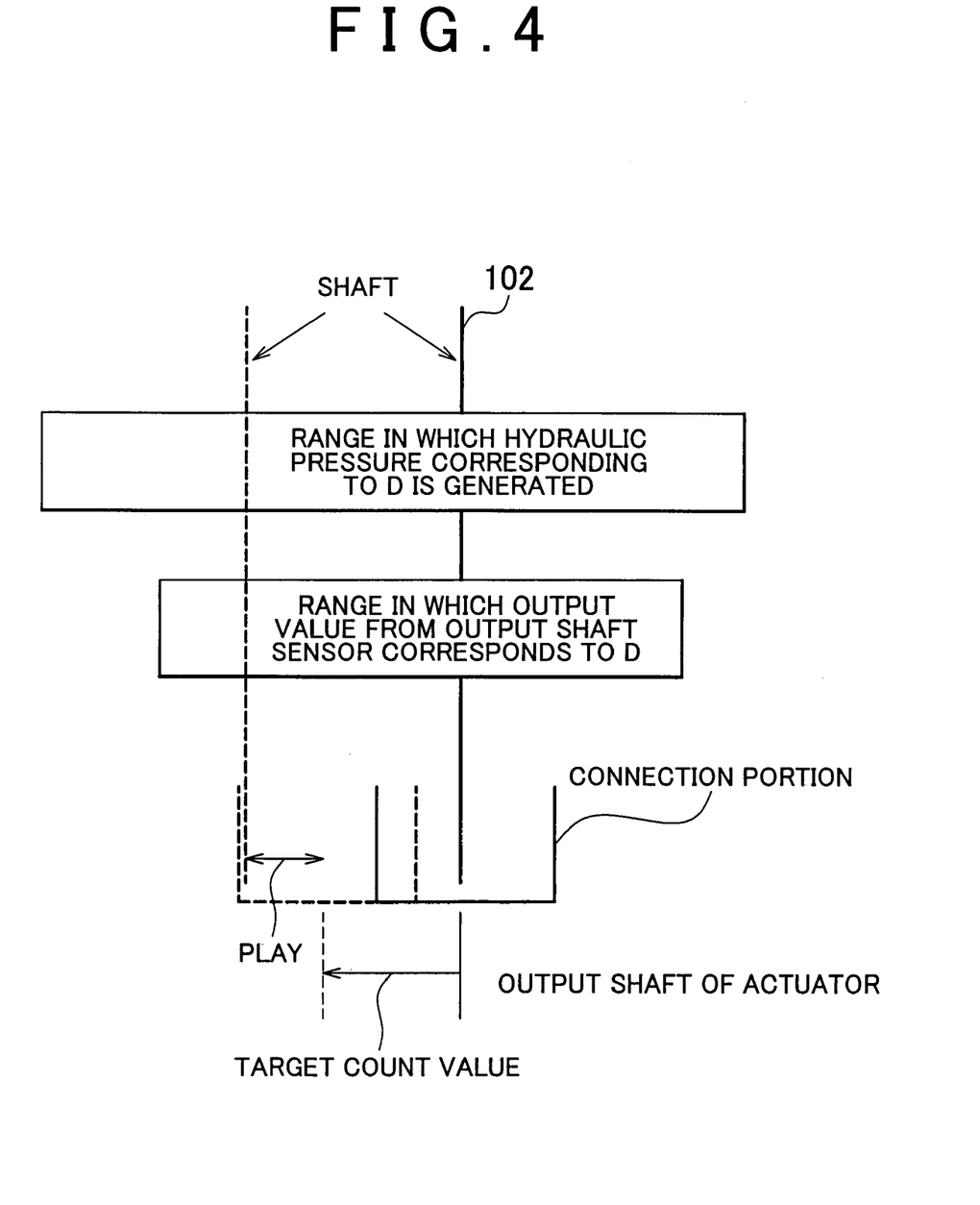
FIG. 4 is a view showing a play at a connection portion at which a shaft and an output shaft of an actuator are connected to each other.

For example, if the rotation stop position of the shaft 102 and the actuator 42 corresponds to D, as indicated by the solid line in FIG. 4, the spool valve in the manual valve is also at the position corresponding to D. Accordingly, a hydraulic pressure corresponding to D is generated in the hydraulic circuit. Also, a rotational position signal, which indicates that the rotation stop position of the shaft 102 is within the rotational stop positional-range corresponding to D, is transmitted from the output shaft sensor 58. The description below will be provided on the assumption that, at the connection portion at which the shaft 102 and the output shaft of the actuator 42 are connected to each other, the shaft 102 is at substantially the center position of the range of a play at the actuator 42. At the connection portion, the shaft 102 and the actuator 42 are, for example, splined to each other.

The predetermined rotation amount of the shaft 102 and the actuator 42 is indicated by the region between the position indicated by the solid line in FIG. 4 and the dotted line in FIG. 4. At the position indicated by the dotted line in FIG. 4, the shaft 102 is at a position within the range in which a hydraulic pressure corresponding to D is generated by the manual valve and also within the range in which the output value from the output shaft sensor 58 indicates that the rotation stop position of the shaft 102 is within the rotational stop positional-range corresponding to D.

As described above, a play is present between the shaft 102 and the actuator 42. Therefore, the target count value is set to a value corresponding to the rotation amount obtained by subtracting the amount of play from the rotation amount indicated by the region between the position indicated by the solid line in FIG. 4 and the dotted line in FIG. 4. According to the first embodiment of the invention, the target count value is set to the count value corresponding to the rotation amount obtained by subtracting the amount of play on one side (on the left side in FIG. 4), which is indicated by the region between the position of the shaft 102 indicated by the dotted line and the position of the output shaft of the actuator 42 indicated by the dotted line, from the rotation amount indicated by the region between the position indicated by the solid line in FIG. 4 and the dotted line in FIG. 4. However, the target count value is not limited to this. For example, the target count value may be set to the count value corresponding to the rotation amount obtained by subtracting the amount of the entire play between the shaft 102 and the actuator 42 from the rotation amount indicated by the region between the position indicated by the solid line in FIG. 4 and the dotted line in FIG. 4.

The counter value determination unit 414 shown in FIG. 3 determines whether the count value received from the encoder 46 changes. When it is determined that the count value changes, the counter value determination unit 414 may set a change determination flag.

The shift-position changing operation determination unit 416 determines whether the driver has operated the shift lever to change the shift positions. The shift-position changing operation determination unit 416 determines whether the shift lever has been operated to change the shift positions, based on a shift signal received from the shift switch 26. The shift-position changing operation determination unit 416 may set a shift-position changing operation determination flag, when it is determined that the shift lever has been operated to change the shift positions.

The running determination unit 418 determines whether the vehicle is running. More specifically, the running determination unit 418 determines that the vehicle is running, when it is determined, based on a vehicle speed signal received from the vehicle speed sensor 56, that the vehicle speed is equal to or higher than the predetermined second speed. The running determination unit 418 may set a running determination flag, when it is determined that the vehicle is running. The predetermined second speed may be equal to the predetermined first speed.

The output shaft sensor operating state determination unit 420 determines whether the output shaft sensor 58 is operating based on a rotational position signal received from the output shaft sensor 58. More specifically, the output shaft sensor operating state determination unit 420 determines whether the rotational position signal received from the output shaft sensor changes due to the rotation of the actuator 42. When it is determined that the rotational position signal changes, the output shaft sensor operating state determination unit 420 determines that the output shaft sensor 58 is operating. The output shaft sensor operating state determination unit 420 may set an operating state determination flag, when it is determined that the output shaft sensor 58 is operating.

The failsafe process execution unit 422 executes the failsafe process to deal with a failure in the automatic transmission. More specifically, the failsafe process execution unit 422 may disengage the clutches and brakes that are the friction devices of the shift mechanism 60 to shut off power transfer from the engine to the drive wheels, or continue the state in which the braking force applied by a braking device to the vehicle is maintained.

The actuator reverse control unit 424 controls the actuator 42 such that the rotation stop position of the actuator 42 is brought back within the predetermined rotation stop positional-range corresponding to the selected shift position. The predetermined multiple rotation stop positional-ranges corresponding to the respective shift positions are set. The actuator reverse control unit 424 may control the actuator 42 such that the actuator 42 rotates in the reverse direction by the amount corresponding to the target count value.

The actuator reverse control unit 424 may execute the reverse control over the actuator 42, when the change determination flag is on, the shift determination flag is off, the running determination flag is on, and the operating state determination flag is on.

The description will be provided on the assumption that each of the changing operation determination unit 402, the shift-position determination unit 404, the oil temperature determination unit 406, the stop determination unit 408, the valve-sticking detection process execution unit 410, the actuator drive control unit 412, the counter value determination unit 414, the shift-position changing operation determination unit 416, the running determination unit 418, the output shaft sensor operating state determination unit 420, the failsafe process execution unit 422, and the actuator reverse control unit 424 functions as software implemented when the CPU that is the calculation process execution unit 400 executes the program stored in the storage unit 600. Alternatively, these units may be implemented by hardware. The programs are stored in a recording medium mounted in the vehicle.

The storage unit 600 stores various information, programs, threshold values, maps, etc. The calculation process execution unit 400 reads the data in the storage unit 600, and stores the data in the storage unit 600, when required.

Figure 5:
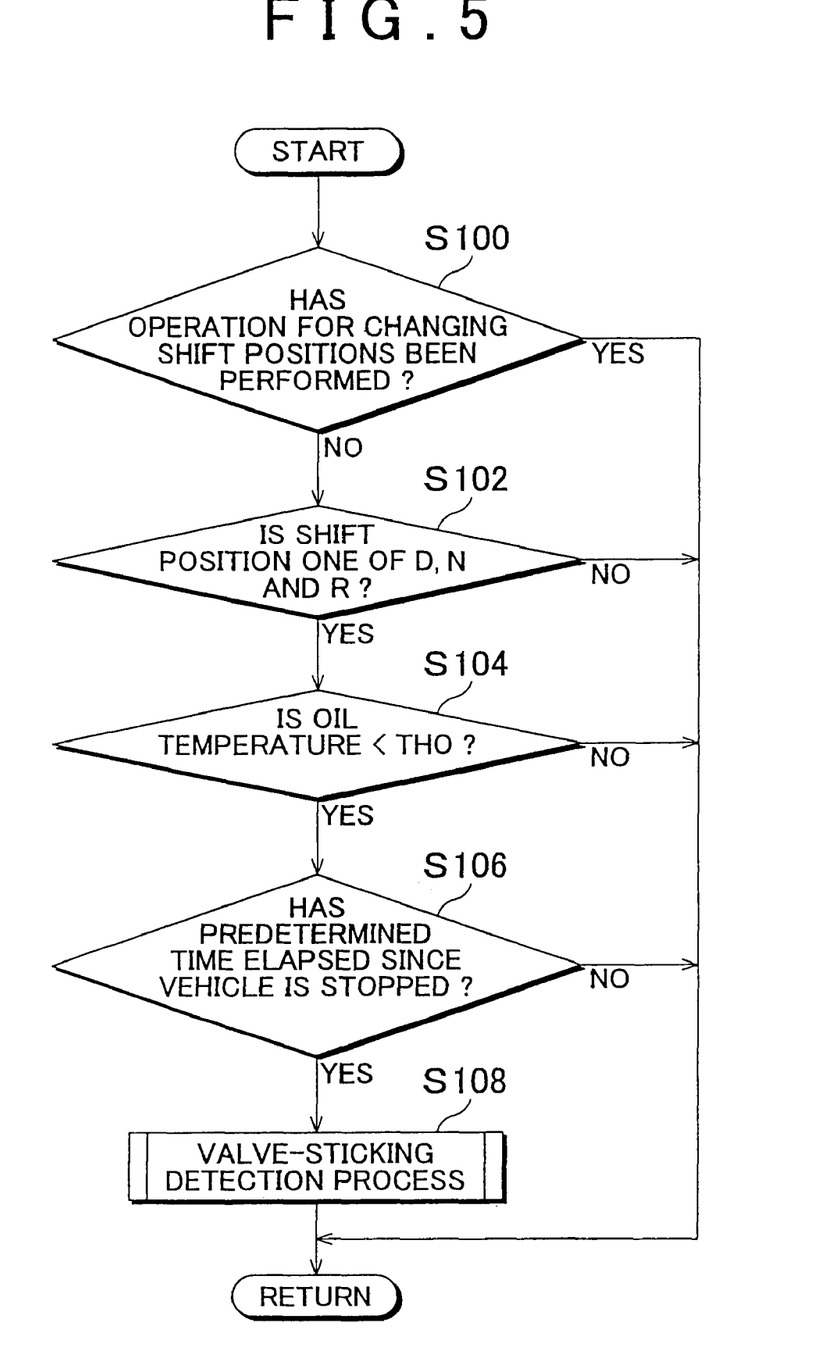
FIG. 5 is a first flowchart of the routine executed by the SBW-ECU according to the first embodiment of the invention.

With reference to FIG. 5, the routine executed by the SBW-ECU 40 will be described.

In step (hereinafter, step will be referred to as "S") 100, the SBW-ECU 40 determines whether the shift lever has been operated to change the shift positions. When it is determined that the shift lever has been operated ("YES" in S100), the routine ends. On the other hand, when it is determined that the shift lever has not been operated ("NO" in S100), S102 is executed.

In S102, the SBW-ECU 40 determines whether the selected shift position is one of D, N and R. If it is determined that the selected shift position is one of D, N and R ("YES" in S102), S104 is executed. On the other hand, if the selected shift position is neither D, N nor R ("NO" in S102), the routine ends.

In S104, the SBW-ECU 40 determines whether the oil temperature detected by the oil temperature sensor 54 is lower than the predetermined temperature THO. When it is determined that the oil temperature is lower than the predetermined temperature THO ("YES" in S104), S106 is executed. On the other hand, when it is determined that the oil temperature is equal to or higher than the predetermined temperature THO ("NO" in S104), the routine ends.

In S106, the SBW-ECU 40 determines whether the predetermined duration has elapsed since the vehicle speed detected by the vehicle speed sensor 56 falls below the predetermined first speed. When it is determined that the predetermined duration has elapsed since the vehicle speed falls below the predetermined first speed ("YES" in S106), S108 is executed. On the other hand, in the case when the vehicle speed is equal to or higher than the predetermined first speed, or in the case when it is determined that the predetermined duration has not elapsed since the vehicle speed falls below the predetermined first speed ("NO" in S106), the routine ends.

In S108, the SBW-ECU 40 executes the valve-sticking detection process, which will be described later in detail.

Next, the routine of the valve-sticking detection process executed by the SBW-ECU 40 will be described with reference to FIG. 6.

In S200, the SBW-ECU 40 rotates the actuator 42 by the predetermined rotation amount so that the roller 112 moves toward the P-indentation 124.

In S202, the SBW-ECU 40 determines whether the count value detected by the encoder 46 changes. When it is determined that the count value changes ("YES" in S202), S204 is executed. On the other hand, when it is determined that the count value does not change ("NO" in S202), S212 is executed.

In S204, the SBW-ECU 40 determines whether the operation for changing the shift positions has been performed. When it is determined that the operation for changing the shift positions has been performed ("YES" in S204), the routine ends. On the other hand, when it is determined that the operation for changing the shift positions has not been performed ("NO" in S204), S206 is executed.

In S206, the SBW-ECU 40 determines whether the vehicle is running. Namely, the SBW-ECU 40 determines whether the vehicle speed is equal to or higher than the predetermined second speed. When it is determined that the vehicle is running ("YES" in S206), S210 is executed. On the other hand, when it is not determined that the vehicle is running ("NO" in S206), S208 is executed.

In S208, the SBW-ECU 40 determines whether the output shaft sensor 58 is operating. When it is determined that the output shaft sensor 58 is operating ("YES" in S208), S210 is executed. On the other hand, when it is determined that the output shaft sensor 58 is not operating ("NO" in S208), S200 is executed again.

In S210, the SBW-ECI 40 executes the reverse control over the actuator 42 such that the rotation stop position of the actuator 42 is brought back within the predetermined rotation stop positional-range corresponding to the selected shift position. The SBW-ECU 40 rotates the actuator 42 in the direction in which the P-indentation 124 of the detent plate 100 moves away from the roller 112 such that the rotation stop position of the actuator 42 is brought back within the predetermined rotation stop positional-range corresponding to the selected shift position.

In S212, the SBW-ECU 40 executes the failsafe process.

The SBW-ECU 40 has the above-described structure, and executes the control according to the above-described flowcharts. The operation of the SBW-ECU 40 will be described with reference to FIG. 7A to FIG. 7F.

Figures 7A, 7B:
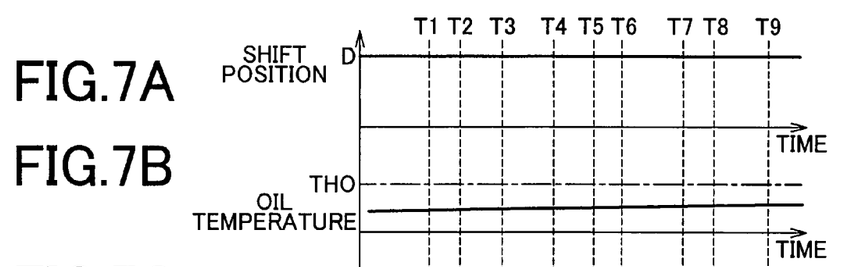
FIGS. 7A to 7F illustrate a timing chart showing the operation of the SBW-ECU according to the first embodiment of the invention.
Figure 7C:
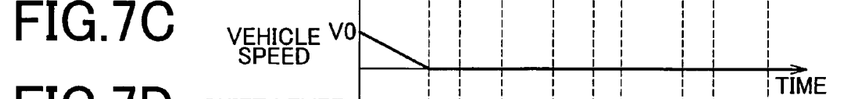

The description below will be provided on the assumption that D is selected as the shift position as shown in FIG. 7A, and the vehicle speed is decreased from the vehicle speed V0 due to, for example, depression of a brake pedal and becomes substantially equal to zero at time T1 as shown in FIG. 7C.

Figure 7D:
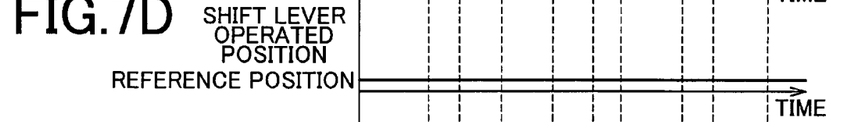

At time T2 that is reached when a predetermined time has elapsed since time T1, the operation of the shift lever for changing the shift positions has not been performed, as shown in FIG. 7D ("NO" in S100). Also, as shown in FIG. 7A, D is selected ("YES" in S102). In addition, as shown in FIG. 7B, the oil temperature is lower than the predetermined temperature THO ("YES" in S104). As shown in FIG. 7C, the duration during which the vehicle is stopped exceeds the predetermined duration ("YES" in S106). Accordingly, the valve-sticking detection process is executed (S108).

Figure 7E:
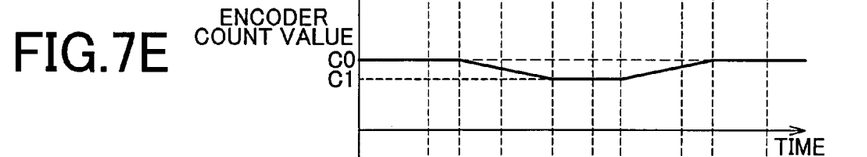

Namely, the actuator 42 is rotated by the predetermined rotation amount in the direction in which the P-indentation 124 of the detent plate 100 moves toward the roller 112 (S200). At this time, as shown in FIG. 7E, the count value of the encoder 46 starts changing, at time T2, from C0. The count value of the encoder 46 changes by the target count value corresponding to the amount by which the actuator 42 is rotated in the direction in which the P-indentation 124 of the detent plate 100 moves toward the roller 112.

Figure 7F:
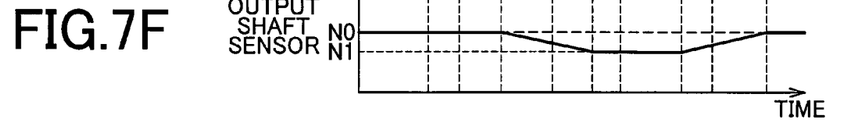

When the actuator 42 is rotated, a play between the actuator 42 and the shaft 102 is removed on the P-indentation 124 side. At time T3, the rotational position detected by the output shaft sensor 58 starts changing from N0 in the direction in which the P-indentation 124 of the detent plate 100 moves toward the roller 112, as shown in FIG. 7F.

When the count value detected by the encoder 46 becomes equal to the value C1, that is larger than the count value C0 by the target count value, at time T4, for example, the electric power supplied to the actuator 42 is shut off and therefore the control over the actuator 42 is terminated.

After the control over the actuator 42 is terminated, only the shaft 102 continues rotating. At time T5, the shaft 102 stops rotating at the position at which the rotational position detected by the output shaft sensor 58 matches the position N1. The position N1 is reached after the shaft 102 is rotated from the position N0 by the predetermined rotation amount.

Namely, during the period from time T2 to time T4, the count value detected by the encoder 46 changes ("YES" in S202). As shown in FIG. 7D, the operation for changing the shift positions is not performed during this period ("NO" in S204). Also, the vehicle is stopped ("NO" in S206), and the output shaft sensor 58 is operating ("YES" in S208).

Accordingly, the control over the actuator 42 is started at time T6 so that the rotation stop position of the actuator 42 is brought back into the predetermined rotation stop positional-range corresponding to D which is selected by the shift-position changing mechanism 48 (the actuator 42 is rotated in the direction in which the P-indentation 124 of the detent plate 100 moves away from the roller 112) (S210). The actuator 42 starts rotating, at time T6, in the direction in which the P-indentation 124 of the detent plate 100 moves away from the roller 112. The count value detected by the encoder 46 changes from C1 to C0.

When a play between the actuator 42 and shaft 102 is removed on the side opposite to the P-indentation 124, the rotational position detected by the output shaft sensor 58 starts changing at time T7.

When the count value detected by the encoder 46 matches the count value corresponding to the predetermined rotation stop positional-range at T8, the control over the actuator 42 is terminated. After the control over the actuator 42 is terminated, the shaft 102 continues rotating, and stops rotating, at time T9, when the rotational position detected by the output shaft sensor 58 matches the position corresponding to the predetermined position.

If the count value detected by the encoder 46 remains unchanged as shown by the dotted line in FIG. 7E ("NO" in S202) although the actuator is driven (S200), the failsafe process is executed (S212).

With the control apparatus for the shift-position changing mechanism 48 described above, when a command to change the shift positions based on a change in the state of the shift lever has not been issued, if the conditions concerning the shift position, the oil temperature and the vehicle speed are satisfied, the actuator 42 is rotated. Thus, whether a failure has occurred in the automatic transmission is determined before a command to change the shift positions is received. When it is determined that the rotation amount of the actuator 42 is smaller than the predetermined rotation amount, for example, the output value from the output shaft sensor remains unchanged although the control for rotating the actuator 42 by the predetermined rotation amount is executed, it is determined that a failure has occurred in the automatic transmission connected to the actuator 42. In addition, because there is no influence of a delay in response of the hydraulic pressure to the control even in the environment in which the oil temperature in the automatic transmission is low, it is possible to promptly determine whether a failure has occurred in the automatic transmission. Promptly determining whether a failure has occurred in the automatic transmission makes it possible to execute the failsafe process earlier. Accordingly, it is possible to provide the control apparatus and method for the shift-position changing mechanism 48, which promptly determines whether a failure has occurred in the automatic transmission, thereby making it possible to execute the failsafe process earlier.

In the control for rotating the actuator 42, the rotation amount of the actuator 42 is limited to the predetermined rotation amount. Thus, erroneous changes in the shift positions due to this control are suppressed.

When the vehicle is substantially stopped, the control for rotating the actuator 42 by the predetermined rotation amount is executed. When the vehicle starts running, the control for rotating the actuator 42 by the predetermined rotation amount is terminated. Thus, it is possible to prevent a determination whether a failure has occurred in the automatic transmission from being erroneously made due to external factors such as an input from the road surface.

When the control for rotating the actuator by the predetermined rotation amount is terminated, the actuator is controlled so that the rotation stop position of the actuator is brought back into the predetermined rotation stop positional-range corresponding to the selected shift position. Accordingly, when a command to change the shift positions is detected, the control for changing the shift positions is promptly executed.

Hereafter, a control apparatus for the shift-position changing mechanism 48 according to a second embodiment of the invention will be described. The control apparatus for the shift-position changing mechanism 48 according to the second embodiment is the same as the control apparatus for the shift-position changing mechanism 48 according to the first embodiment of the invention except the output shaft sensor 58, and the routine of the valve-sticking detection program executed by the SBW-ECU 40. According to the second embodiment of the invention, the output shaft sensor 58 is formed of on-off switches. The other configurations are the same as those according to the first embodiment of the invention. The same elements are denoted by the same reference numerals. The functions and the steps having the same reference numerals are also the same. Accordingly, the detailed description concerning the elements having the same reference numerals will not be provided below.

The output shaft sensor 58 is formed of multiple on-off switches corresponding to the respective shift positions. When the switch corresponding to the rotational position of the shaft 102 is turned on, the SBW-ECU 40 determines that the shift position corresponding to the switch that is turned on is the shift position selected by the shift-position changing mechanism 48.

Hereafter, the routine of the valve-sticking detection process executed by the SBW-ECU 40 according to the second embodiment of the invention will be described with reference to FIG. 8.

Figure 6:
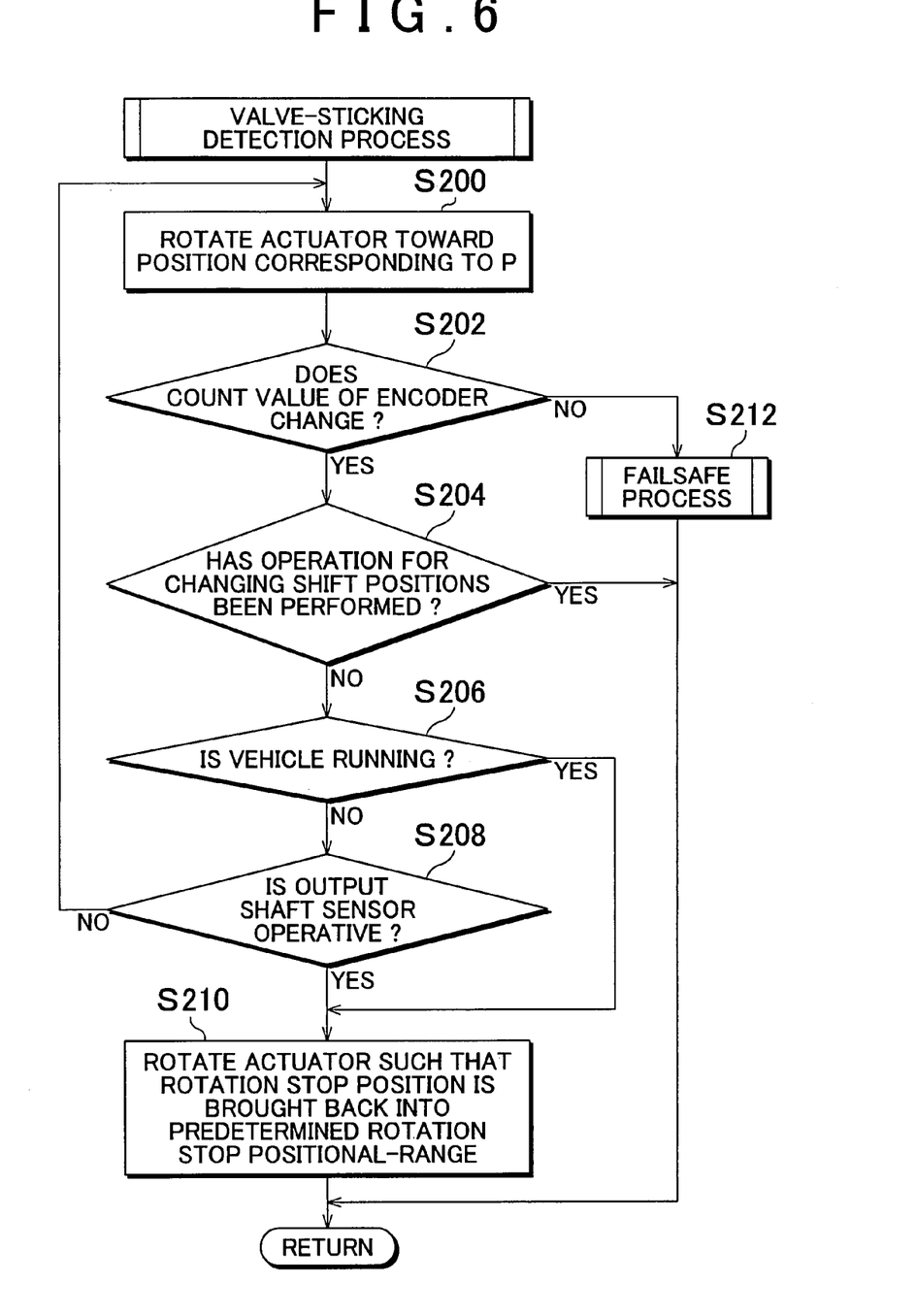
FIG. 6 is a second flowchart of the routine executed by the SBW-ECU according to the first embodiment of the invention.
Figure 8:
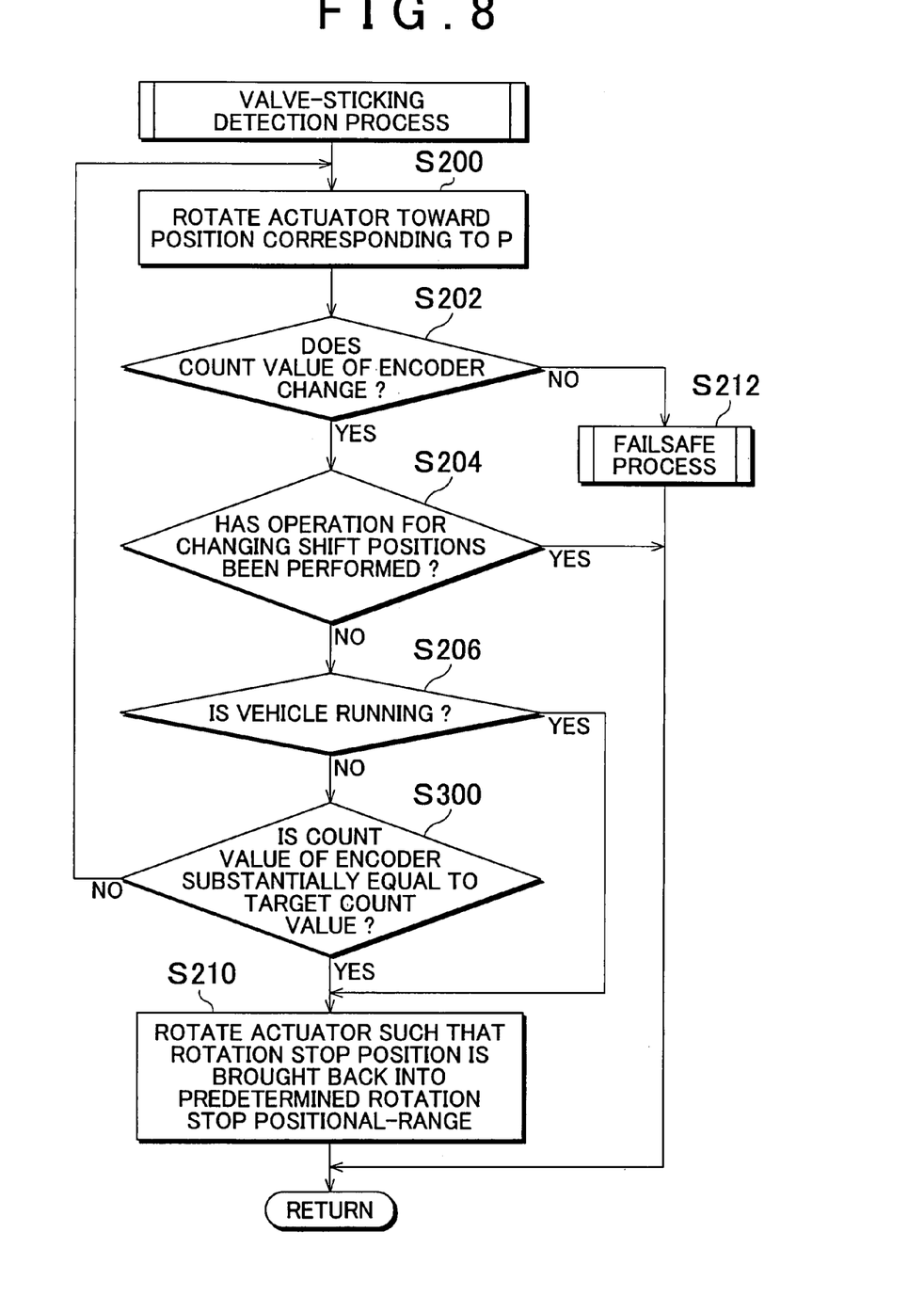
FIG. 8 is a flowchart of the routine executed by an SBW-ECU according to a second embodiment of the invention.

In FIG. 8, the steps having the same processes as those in the flowchart in FIG. 6 are denoted by the same step numbers. Accordingly, the description concerning the steps having the same step numbers will not be provided below.

When the SBW-ECU 40 determines that the vehicle is not running ("NO" in S206), the SBW-ECU 40 determines in S300 whether the count value of the encoder 46 substantially equal to the target count value. The target count value is set to a value corresponding to the shift position selected by the shift-position changing mechanism 48. The target count value is not particularly limited. When the count value of the encoder 46 is substantially equal to the target count value ("YES" in S300), S210 is executed. On the other hand, when the count value of the encoder 46 is neither substantially equal to nor equal to the target count value ("NO" in S300), S200 is executed again.

The SBW-ECU 40 has the above-described structure, and executes the control according to the above-described flowchart. The operation of the SBW-ECU 40 will be described with reference to FIG. 9A to FIG. 9E.

Figure 9A:
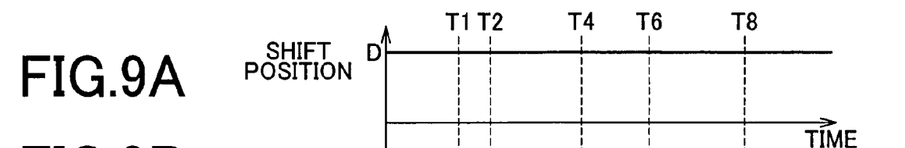
FIGS. 9A to 9E illustrate a timing chart showing the operation of the SBW-ECU according to the second embodiment of the invention.
Figure 9B:
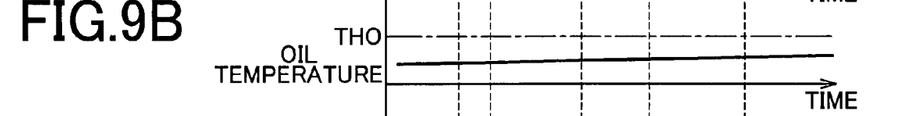
Figure 9C:
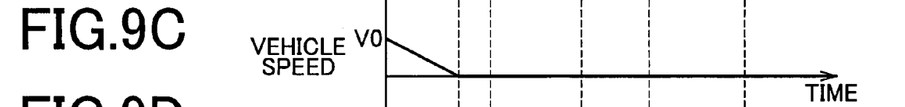

The description below will be provided on the assumption that D is selected as the shift position as shown in FIG. 9A, and the vehicle speed decreases from V0 due to, for example, depression of the brake pedal and becomes substantially equal to zero at time T1 as shown in FIG. 9C.

Figure 9D:
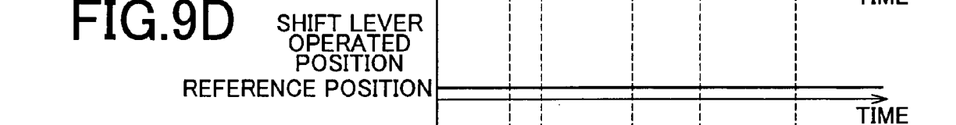

At time T2 which is reached when a predetermined time has elapsed since time T1, the operation of the shift lever for changing the shift positions has not been performed, as shown in FIG. 9D ("NO" in S100). Also, as shown in FIG. 9A, D is selected as the shift position ("YES" in S102). In addition, the oil temperature is lower than the predetermined temperature THO, as shown in FIG. 9B ("YES" in S104). As shown, in FIG. 9C, the duration during which the vehicle is stopped exceeds a predetermined duration ("YES" in S106). Accordingly, the valve-sticking detection process is executed (S108).

Figure 9E:
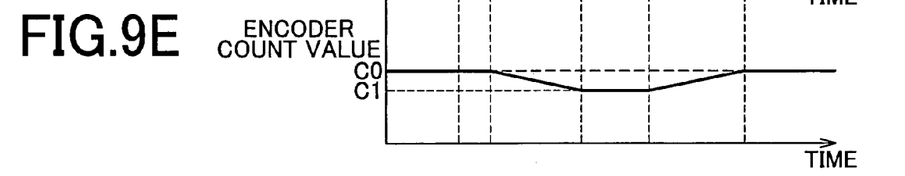

Namely, the actuator 42 is rotated by a predetermined rotation amount in the direction in which the P-indentation 124 moves toward the roller 112 (S200). At this time, as shown in FIG. 9E, the count value of the encoder 46 starts changing, at time T2, from C0. The count value of the encoder 46 changes by the target count value corresponding to the amount by which the actuator 42 is rotated in the direction in which the P-indentation 124 of the detent plate 100 moves toward the roller 112.

When the actuator 42 is rotated, a play between the actuator 42 and the shaft 102 is removed on the P-indentation 124 side.

When the count value detected by the encoder 46 becomes equal to the value C1, that is larger than the count value C0 by the target count value, at time T4, for example, the electric power supplied to the actuator 42 is shut off and therefore the control over the actuator 42 is terminated.

Namely, the count value detected by the encoder 46 changes during the period from time T2 to time T4 ("YES" in S202). As shown in FIG. 9D, the operation for changing the shift positions is not performed during this period ("NO" in S204). When it is determined that the vehicle is stopped ("NO" in S206), and the count value is equal to the target count value ("YES" in S300), the control over the actuator 42 is started at time T6 such that the rotation stop position of the actuator 42 is brought back within the predetermined rotation stop positional-range corresponding to D that is selected by the shift-position changing mechanism 48 (S210). At this time, the actuator 42 starts rotating in the direction in which the P-indentation 124 of the detent plate 100 moves away from the roller 112. The count value detected by the encoder 46 changes from C1 to C0.

When the count value becomes equal to the value corresponding to the predetermined rotation stop positional-range at time T8, the control over the actuator 42 is terminated.

If the count value detected by the encoder 46 remains unchanged as shown by the dotted line in FIG. 9E ("NO" in S202) although the actuator is driven (S200), the failsafe process is executed (S212).

The control apparatus for the shift-position changing mechanism 48 according to the second embodiment of the invention produces the same effects as those produced by the control apparatus for the shift-position changing mechanism 48 according to the first embodiment of the invention. In addition, when the output shaft sensor 58 that is formed of the on-off switches is provided, it is also possible to promptly determine whether a failure has occurred in the automatic transmission.

The control apparatus for the shift-position changing mechanism 48 according to each of the first and second embodiment of the invention may be provided with a timer that measures the time which has elapsed since the valve-sticking detection process is started. There may be provided a step in which whether the time that has elapsed since the valve-sticking detection process is started is equal to or longer than a predetermined time is made. This step is executed before executing S200 again when a negative determination is made in S208 or S300. When an affirmative determination is made in this step, S212 may be executed. When a negative determination is made in this step, S200 may be executed again. Namely, the control apparatus for the shift-position changing mechanism 48 according to the invention may execute the following control. When the SBW-ECU 40 determines in S202 that the count value detected by the encoder 46 changes ("YES" in S202), but determines that the output sensor 58 is not operating in S208 in the first embodiment of the invention ("NO" in S208), or determines that the count value of the encoder 46 is not neither equal to nor substantially equal to the target count value in S300 in the second embodiment of the invention ("NO" in S300), the SBW-ECU 40 compares the time that has elapsed since the valve-sticking detection process is started with the predetermined time.

When the elapsed time becomes equal to or longer than the predetermined time, the failsafe process may be executed (S212).

The control apparatus according to the invention may be applied to any one of an automatic transmission that executes the gear control in which the gear corresponding to the shift-position selected by the driver is used, and an automatic transmission that executes the shift-range control in which the gear corresponding to the shift-position selected by the driver and the gears lower than the selected gear are all used.

The embodiments of the invention that have been described in the specification are to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a shift-position changing mechanism that changes shift positions of an automatic transmission mounted in a vehicle using a rotational force of an actuator based on a state of an operation member, comprising:
   a detection unit that detects a command to change the shift positions based on a change in the state of the operation member;
   a control unit that controls the actuator such that the actuator is rotated by a predetermined rotation amount, when a predetermined first condition concerning a state of the vehicle is satisfied in a case where the command to change the shift positions is not detected; and
   a determination unit that determines that a failure has occurred in the shift-position changing mechanism, when a predetermined second condition is satisfied after the control over the actuator is started.

2. The control apparatus according to claim 1, wherein the predetermined rotation amount is set such that rotating the actuator by the predetermined amount does not change the shift positions.

3. The control apparatus according to claim 1, further comprising:
   a hydraulic control mechanism that changes the shift positions based on a change in a hydraulic pressure of hydraulic fluid due to the rotation of the actuator.

4. The control apparatus according to claim 1, wherein the predetermined first condition is a condition that the shift position of the automatic transmission is set to one of a forward running position, a reverse running position and a neutral position.

5. The control apparatus according to claim 1, further comprising:
   a temperature detection unit that detects a temperature of hydraulic fluid in the automatic transmission,
   wherein
   the predetermined first condition is a condition that the detected temperature is lower than a predetermined temperature.

6. The control apparatus according to claim 1, further comprising:
   a speed detection unit that detects a speed of the vehicle,
   wherein
   the predetermined first condition is a condition that a duration during which the detected speed is lower than a predetermined first speed is equal to or longer than a predetermined duration.

7. The control apparatus according to claim 1, further comprising:
   an actuator rotation amount detection unit that detects a rotation amount of the actuator,
   wherein
   the determination unit determines whether the predetermined second condition is satisfied based on a rotation amount of the actuator detected by the actuator rotation amount detection unit.

8. The control apparatus according to claim 7, wherein the determination unit determines that the predetermined second condition is satisfied, in a case where the rotation amount of the actuator remains unchanged or in a case where the rotation amount of the actuator is smaller than the predetermined rotation amount when a time equal to or longer than the predetermined time has elapsed since the control over the actuator is started.

9. The control apparatus according to claim 1, further comprising:
   an output shaft rotation amount detection unit that detects a rotation amount of an output shaft that is rotated by the actuator,
   wherein
   the determination unit determines whether the predetermined second condition is satisfied based on a rotation amount of the output shaft, which is detected by the output shaft rotation amount detection unit.

10. The control apparatus according to claim 9, wherein the determination unit determines that the predetermined second condition is satisfied, in a case where the rotation amount of the output shaft remains unchanged for a predetermined time or longer after the control is started.

11. The control apparatus according to claim 1, further comprising:
    a speed detection unit that detects a speed of the vehicle,
    wherein
    the control unit terminates the control over the actuator, when the detected speed is equal to or higher than a predetermined second speed.

12. The control apparatus according to claim 11, further comprising:
    a reverse control unit that controls the actuator such that a rotation stop position of the actuator is brought back within a predetermined rotation stop positional-range corresponding to the selected shift position,
    wherein,
    when the control unit terminates the control over the actuator, the reverse control unit controls the actuator.

13. The control apparatus according to claim 7, further comprising:
    a reverse control unit that controls the actuator such that a rotation stop position of the actuator is brought back within a predetermined rotation stop positional-range corresponding to the selected shift position,
    wherein,
    when the actuator is rotated by the predetermined rotation amount, the control unit terminates the control over the actuator, and the reverse control unit controls the actuator.

14. The control apparatus according to claim 9, further comprising:
    a reverse control unit that controls the actuator such that a rotation stop position of the actuator is brought back within a predetermined rotation stop positional-range corresponding to the selected shift position,
    wherein
    when the output shaft is rotating, the control unit terminates the control over the actuator and the reverse control unit controls the actuator.

15. A control method for a shift-position changing mechanism that changes shift positions of an automatic transmission mounted in a vehicle using a rotational force of an actuator based on a state of an operation member, comprising:

detecting a command to change the shift positions based on a change in the state of the operation member;

controlling the actuator such that the actuator is rotated by a predetermined rotation amount, when a predetermined first condition concerning a state of the vehicle is satisfied in a case where the command to change the shift positions is not detected; and     determining that a failure has occurred in the shift-position changing mechanism, when a predetermined second condition is satisfied after the control over the actuator is started.

\* \* \* \* \*